(12) United States Patent
Siegmeth

(10) Patent No.: US 11,845,350 B2
(45) Date of Patent: Dec. 19, 2023

(54) ENERGY-HARVESTING SPOILER ON A WING OF AN AIRCRAFT

(71) Applicant: The Boeing Company, Chicago, IL (US)

(72) Inventor: Jeff S Siegmeth, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/682,523

(22) Filed: Feb. 28, 2022

(65) Prior Publication Data

US 2022/0250496 A1 Aug. 11, 2022

Related U.S. Application Data

(63) Continuation of application No. 16/453,601, filed on Jun. 26, 2019, now Pat. No. 11,292,356.

(51) Int. Cl.

| | |
|---|---|
| *B64C 9/32* | (2006.01) |
| *B64C 9/02* | (2006.01) |
| *B64D 27/24* | (2006.01) |
| *B64D 41/00* | (2006.01) |
| *B64C 9/00* | (2006.01) |
| *B60L 53/52* | (2019.01) |
| *B60L 50/60* | (2019.01) |
| *B60L 8/00* | (2006.01) |

(52) U.S. Cl.
CPC ............... *B60L 53/52* (2019.02); *B60L 8/006* (2013.01); *B60L 50/60* (2019.02); *B64C 9/02* (2013.01); *B64C 9/323* (2013.01); *B64D 27/24* (2013.01); *B64D 41/00* (2013.01); *B64D 41/007* (2013.01); *B60L 2200/10* (2013.01); *B64C 2009/005* (2013.01); *B64D 2221/00* (2013.01)

(58) Field of Classification Search
CPC ..... B64C 9/02; B64C 9/323; B64C 2009/005; B64C 9/146; B64C 41/007; B64D 27/24
See application file for complete search history.

(56) References Cited

U.S. PATENT DOCUMENTS

| | | | |
|---|---|---|---|
| 9,835,138 B2* | 12/2017 | Westergaard | ......... F03D 7/0276 |
| 11,292,356 B2* | 4/2022 | Siegmeth | ................ B64C 13/38 |
| 2018/0230844 A1* | 8/2018 | Vondrell | .............. H02K 7/1823 |

FOREIGN PATENT DOCUMENTS

DE 102016010216 A1 * 3/2018

* cited by examiner

*Primary Examiner* — Timothy D Collins
*Assistant Examiner* — Justin Michael Heston
(74) *Attorney, Agent, or Firm* — Duft & Bornsen, PC

(57) ABSTRACT

Reactive spoilers for aircraft and associated methods. In one embodiment, a wing of an aircraft includes a leading edge, a trailing edge, and an upper surface and a lower surface between the leading edge and the trailing edge. The wing further includes a reactive spoiler disposed on the upper surface between the leading edge and the trailing edge. The reactive spoiler comprises one or more turbines configured to raise in relation to the upper surface into an airflow passing over the upper surface, and to reduce lift of a wing section behind the turbines. The turbines are configured to convert kinetic energy from the airflow into electrical energy.

20 Claims, 12 Drawing Sheets

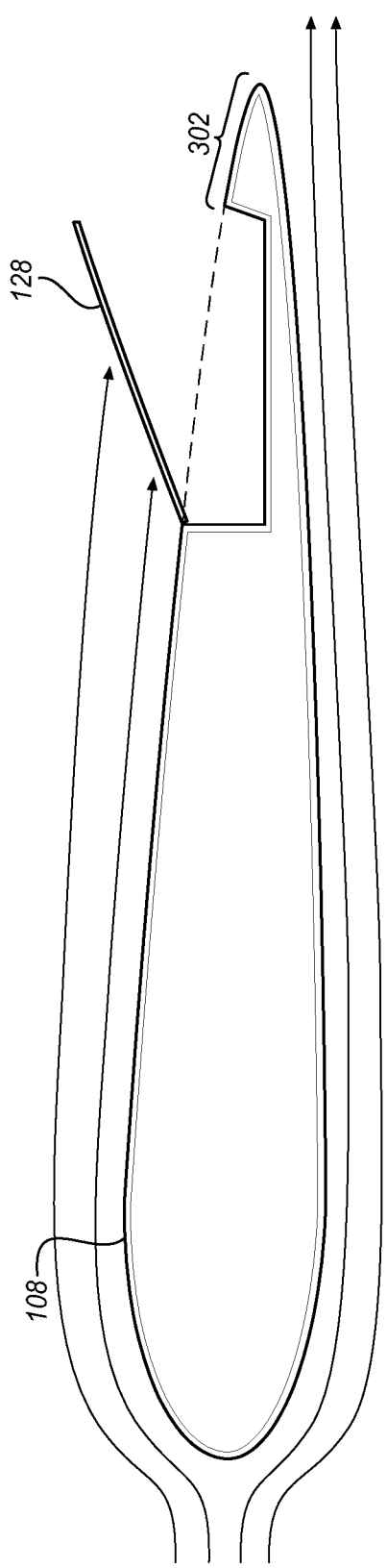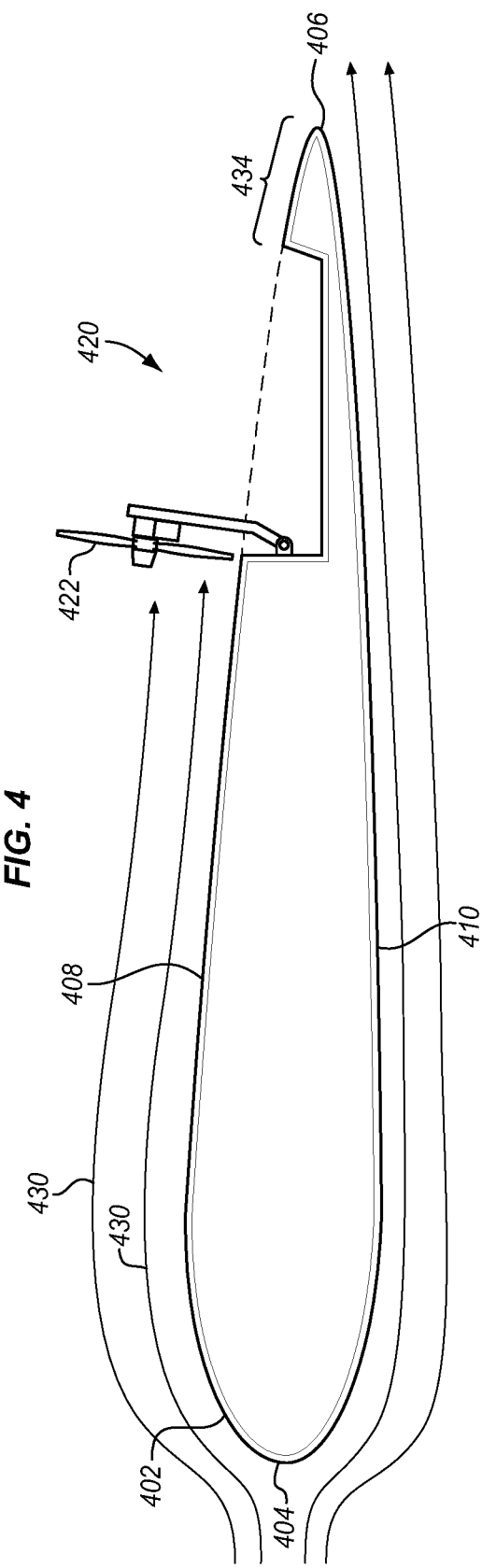

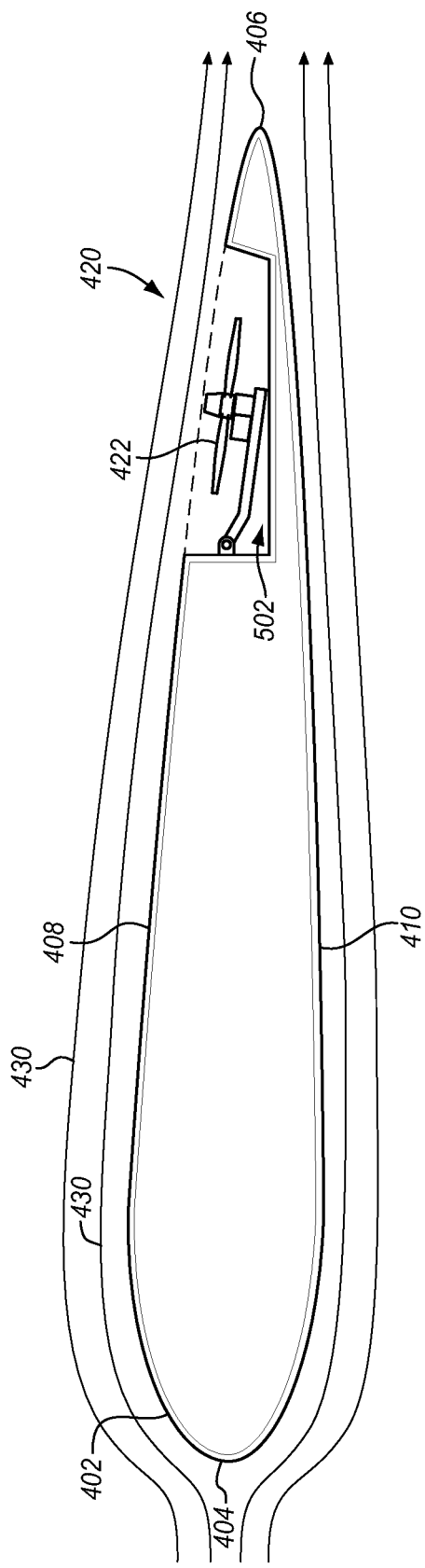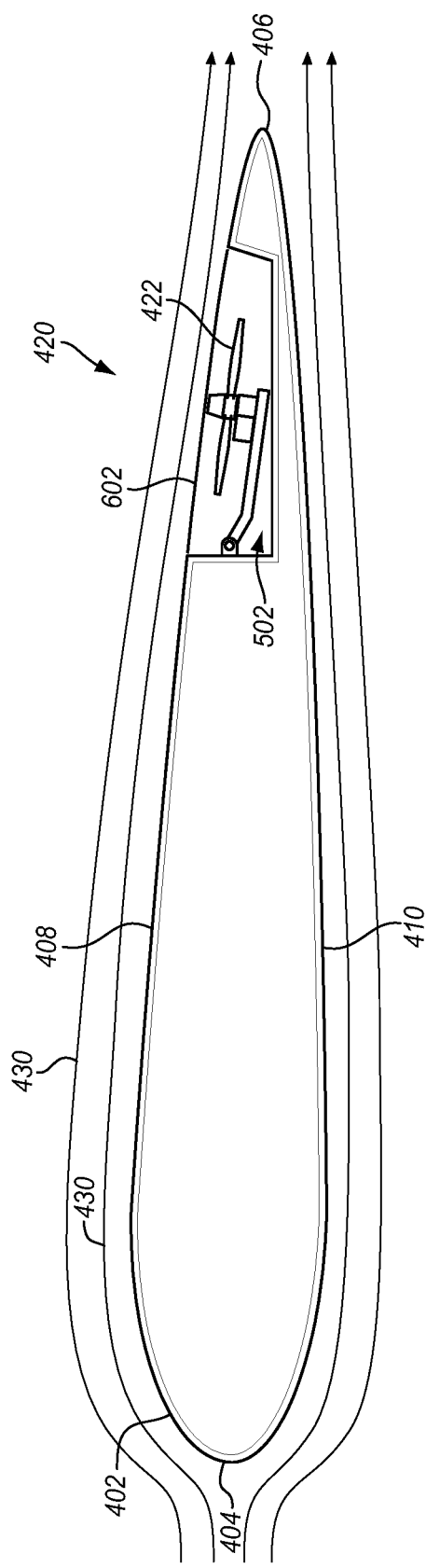

ENERGY-HARVESTING SPOILER ON A WING OF AN AIRCRAFT

RELATED APPLICATIONS

This non-provisional patent application is a continuation of U.S. patent application Ser. No. 16/453,601 filed on Jun. 26, 2019, which is incorporated herein by reference.

FIELD

This disclosure relates to the field of aircraft, and more particularly, to spoilers on wings of aircraft.

BACKGROUND

Some aircraft include spoilers on the upper surface of the wings. The spoilers generally comprise panels that conform to the upper surface of a wing when stowed, and pivot upwards into the airflow passing over the wing when extended. When pivoted upward, the spoiler creates a controlled stall over the portion of the wing behind it, which reduces the lift of that wing section. Spoilers may be deployed, for instance, to allow for descent of the aircraft from cruise altitudes without increase in airspeed. The use of spoilers is often limited as turbulent airflow that develops behind the spoilers causes noise and vibration that is noticeable to passengers on the aircraft, and full spoiler deployment is unnecessary in most conditions.

SUMMARY

Provided herein is a reactive spoiler for a wing of an aircraft. The reactive spoiler includes one or more turbines that may be raised above the upper surface of the wing into the airflow over the wing. The rotation of the turbines disturbs the airflow to reduce lift of a wing section behind the turbines, as with a traditional spoiler. The rotation of the turbines also acts to generate electrical energy. Thus, the reactive spoiler harvests energy from the airflow over a wing while also reducing lift of the wing. One technical benefit is that the electrical energy may be provided to an electrical distribution network on the aircraft, such as to charge batteries. This may be especially beneficial for aircraft that utilize electrical engines or hybrid electrical engines, or other electrical propulsion systems, such as an electric motor for taxi operations. The reactive spoilers may also cause less noise and vibration when deployed resulting in a more comfortable flight.

One embodiment comprises a wing of an aircraft comprising a leading edge, a trailing edge, and an upper surface and a lower surface between the leading edge and the trailing edge. The wing further comprises a reactive spoiler disposed on the upper surface between the leading edge and the trailing edge. The reactive spoiler comprises one or more turbines configured to raise in relation to the upper surface into an airflow passing over the upper surface, and to reduce lift of a wing section.

In another embodiment, the turbines are further configured to convert kinetic energy from the airflow into electrical energy with a generator, and to charge one or more batteries on the aircraft with the electrical energy.

In another embodiment, the turbines are further configured to retract below the upper surface and into a wing cavity when in a retracted position.

In another embodiment, the wing further comprises a cover panel configured to cover the turbines and the wing cavity, and to be flush with the upper surface of the wing.

In another embodiment, the reactive spoiler is configured with a four-bar linkage used to raise and retract the turbines and the cover panel as a unit.

In another embodiment, the turbines are aligned linearly in a row along a length of the wing.

In another embodiment, the turbines are arranged in an array along a length of the wing.

In another embodiment, the wing further comprises a panel spoiler disposed on the upper surface inboard or outboard from the reactive spoiler.

In another embodiment, the wing further comprises a panel spoiler disposed on the upper surface of the wing. The reactive spoiler is disposed forward of the panel spoiler.

Another embodiment comprises an aircraft that includes a wing, and a reactive spoiler disposed on an upper surface of the wing between a leading edge and a trailing edge in a chordwise direction. The reactive spoiler is also disposed inboard from an aileron in a lengthwise direction. The reactive spoiler includes a cover panel, and one or more turbines. The reactive spoiler is configured with a four-bar linkage that is used to deploy and retract the cover panel and the turbines as a unit. The cover panel and the turbines are configured to raise via the four-bar linkage in relation to the upper surface of the wing to deploy the turbines. The cover panel and the turbines are configured to retract via the four-bar linkage to stow the turbines in a wing cavity. The turbines when deployed are configured to rotate due to kinetic energy from an airflow over the upper surface of the wing, and to convert the kinetic energy to electrical energy with a generator while reducing lift provided by the wing.

In another embodiment, the aircraft further comprises a panel spoiler disposed on the upper surface of the wing inboard or outboard from the reactive spoiler.

In another embodiment, the aircraft further comprises a panel spoiler disposed on the upper surface of the wing. The reactive spoiler is disposed upstream from the panel spoiler.

In another embodiment, the generator is configured to charge one or more batteries on the aircraft with the electrical energy.

In another embodiment, the aircraft further comprises an electric engine, and the batteries are configured to provide power to the electric engine.

In another embodiment, the aircraft further comprises a hybrid electric engine, and the batteries are configured to provide power to the hybrid electric engine.

In another embodiment, the aircraft further comprises a controller configured to adjust a resistance of the turbines to adjust an amount of lift reduction provided by the turbines.

Another embodiment comprises a method of operating a reactive spoiler on wings of an aircraft. The method comprises deploying turbines of the reactive spoiler during flight of the aircraft, reducing lift of the wings with the turbines, converting kinetic energy from airflow over the wings into electrical energy via the turbines, and providing the electrical energy to an electrical distribution network on the aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 3 is a schematic cross-sectional view of a wing of an aircraft.

FIG. 4 is a schematic cross-sectional view of a wing of an aircraft in an illustrative embodiment.

FIG. 5 is another schematic cross-sectional view of a wing of an aircraft in an illustrative embodiment.

FIG. 6 is another schematic cross-sectional view of a wing of an aircraft in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
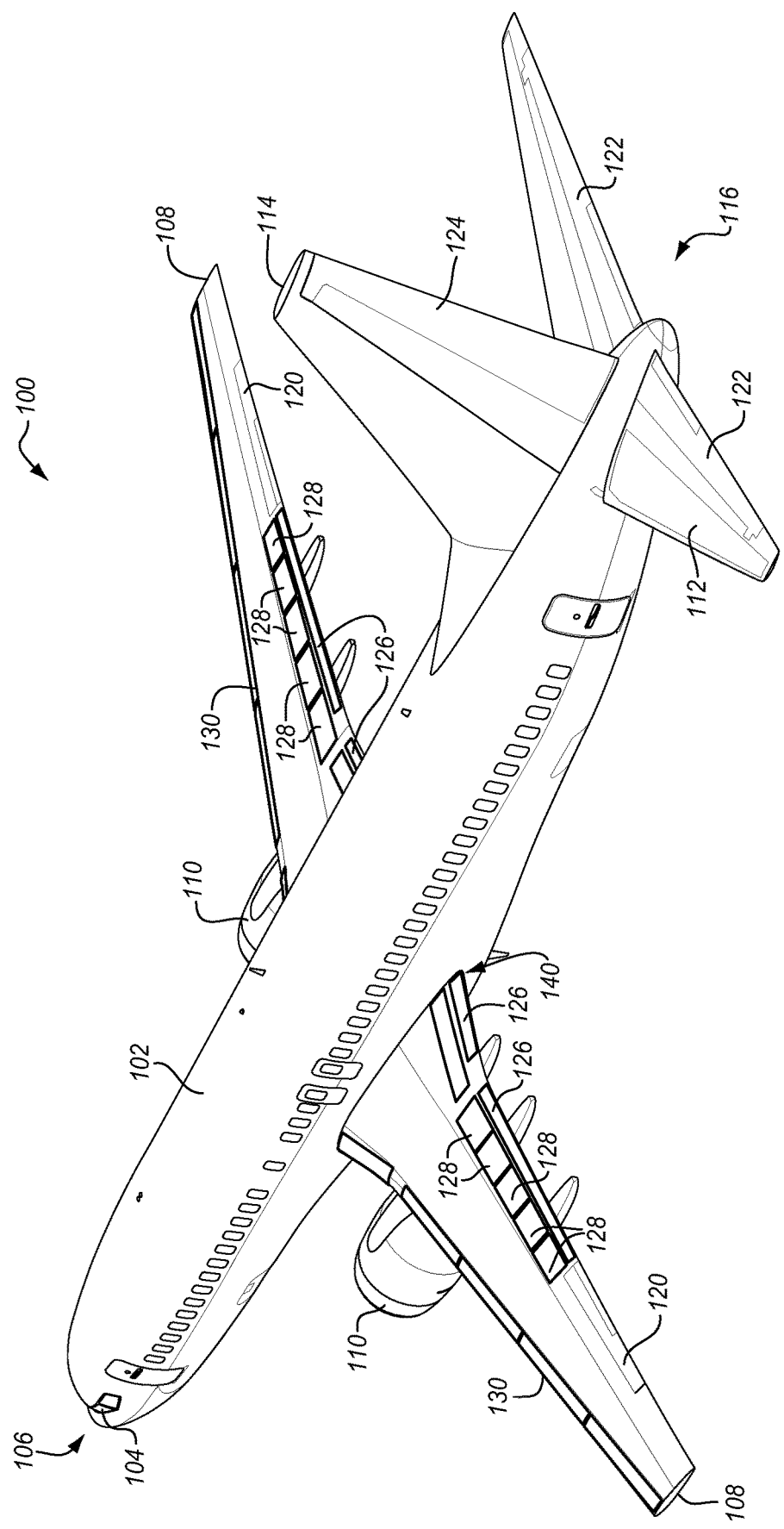
FIG. 1 is a perspective view of an aircraft.

FIG. 1 is a perspective view of an aircraft 100. Aircraft 100 includes a fuselage 102, which comprises the main body of aircraft 100. The cockpit 104 is situated toward the front or nose 106 of aircraft 100. A pair of wings 108 project outward from fuselage to provide lift for aircraft 100, and one or more engines 110 provide thrust. A horizontal stabilizer 112 and a vertical stabilizer 114 are situated toward a tail 116 of aircraft 100. Aircraft 100 further includes flight control surfaces that allow a pilot to adjust and control the flight attitude of aircraft 100. The primary flight control surfaces include ailerons 120, an elevator 122, and a rudder 124. Ailerons 120 are mounted on the trailing edge of wings 108 near the wingtips, and move in opposite directions to primarily control roll of aircraft 100. The elevator 122 is a moveable part of horizontal stabilizer 112 to primarily control the pitch of aircraft 100. The rudder 124 is mounted on the trailing edge of the vertical stabilizer 114 to primarily control yaw of aircraft 100. The secondary flight control surfaces include flaps 126, spoilers 128, and slats 130. Flaps 126 are mounted on the trailing edge of wings 108 inboard from ailerons 120. Flaps 126 produce an increase in both lift and drag during low speed flight (e.g., take-off and landing phases). Spoilers 128 disrupt airflow over the wing to reduce lift. Spoilers 128 typically comprise plates or panels on the upper surface of wing 108 that may be raised upward into the airflow to reduce lift. Spoilers 128 are also mounted inboard of ailerons 120 between wing root 140 and ailerons 120. Slats 130 are mounted on the leading edge of wings 108, and extend to increase lift. Although aircraft 100 has been depicted to have a particular configuration for purposes of discussion, aircraft 100 may have other configurations, such as an autonomous aircraft.

Figure 2:
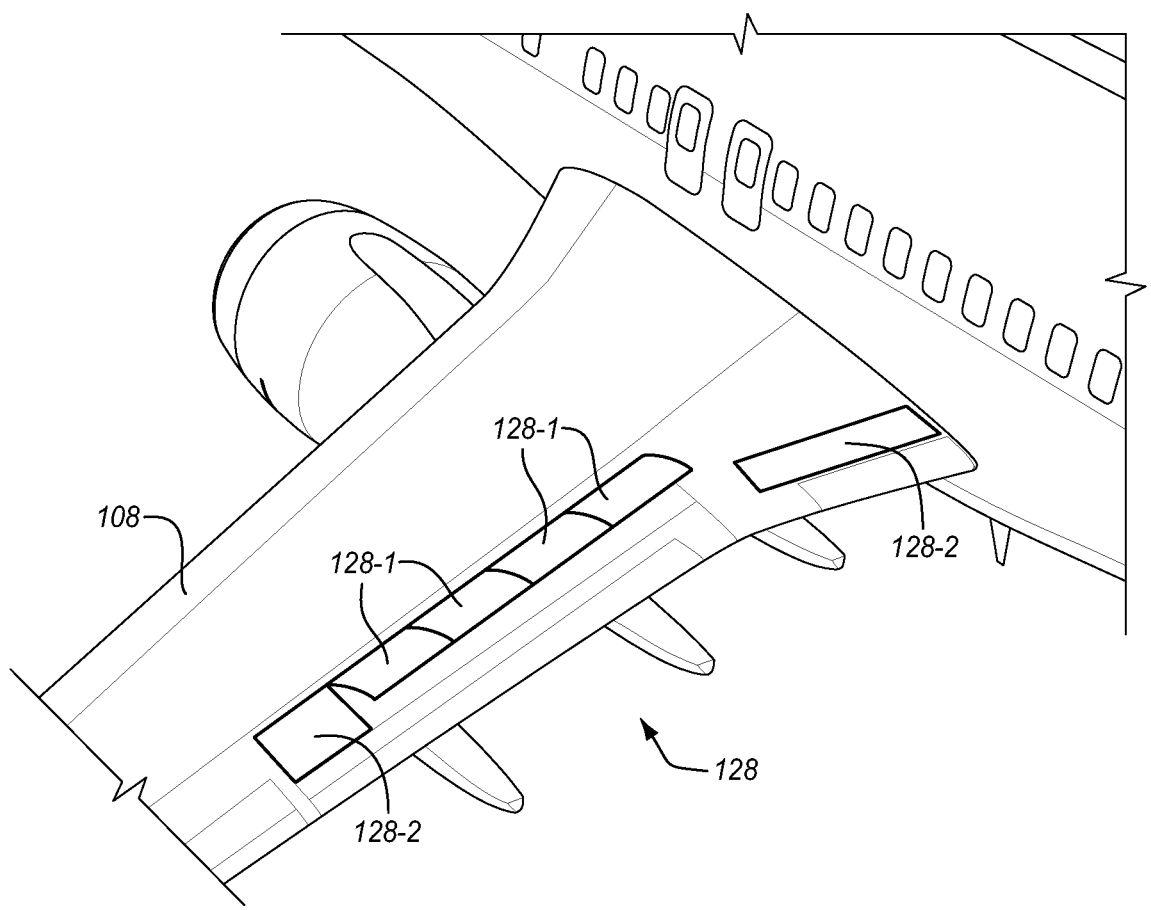
FIG. 2 is a perspective view of a wing of an aircraft.

FIG. 2 is a perspective view of a wing 108 of aircraft 100. This view further illustrates spoilers 128 on wing 108. The configuration of spoilers 128 as shown in FIG. 2 is indicative of a Boeing 737, but other types of aircraft 100 are considered herein. Spoilers 128 include flight spoilers 128-1 and ground spoilers 128-2. Flight spoilers 128-1 comprise panels mounted on the upper surface of wing 108, and are hinged at their leading edge to the upper surface of wing 108. Flight spoilers 128-1 are configured to conform to the upper surface of wing 108 when stowed, and to pivot upward at a controlled angle when extended as illustrated in FIG. 2. When extended, the flight spoilers 128-1 create a stall over the portion of wing 108 behind flight spoilers 128-1 to reduce lift at that wing section. Flight spoilers 128-1 may be extended, such as in manual mode control, to help decelerate aircraft 100 or increase the descent rate of aircraft 100 without increasing speed. Flight spoilers 128-1 may also respond to control wheel movement, such as in an automatic mode, to assist in rolling aircraft 100 in addition to or in lieu of ailerons 120. Ground spoilers 128-2 comprise panels mounted on the outboard and inboard sides of flight spoilers 128-1, and are not used in flight as with flight spoilers 128-1. Like flight spoilers 128-1, ground spoilers 128-2 are configured to conform to the upper surface of wing 108 when stowed, and to pivot upward when extended. Ground spoilers 128-2 may be extended when aircraft 100 is on the ground, such as to operate as speed brakes during landing. Ground spoilers 128-2 cause a considerable loss of lift for wings 108, and the weight of aircraft 100 is transferred from wings 108 to the undercarriage allowing the landing gear to be mechanically braked with a reduced chance of skidding. FIG. 3 is a schematic cross-sectional view of wing 108. In this view, spoiler 128 is extended to create a stall over a wing section 302 behind spoiler 128.

Flight spoilers 128-1 as shown in FIG. 2 are often deployed in a descent of aircraft 100 from a cruising altitude. With flight spoilers 128-1 deployed, aircraft 100 will descend without increasing speed. The descent of a large commercial aircraft, for example, may take thirty minutes or more over a range of a hundred miles or more. In the embodiments described herein, one or more reactive spoilers are implemented on wings of an aircraft. When deployed, the reactive spoilers are configured to reduce lift of the wings as with a traditional spoiler (e.g., flight spoiler 128-1). The reactive spoilers are also configured to harvest kinetic energy from the airflow over the wings, and convert the kinetic energy into electrical energy that may be used by the aircraft. For example, the reactive spoilers may harvest kinetic energy during the descent of an aircraft to charge batteries on the aircraft for flight operations, ground taxiing, etc.

FIG. 4 is a schematic cross-sectional view of a wing 402 of an aircraft in an illustrative embodiment. Wing 402 includes a leading edge 404, a trailing edge 406, an upper surface 408, and a lower surface 410. Leading edge 404 is a part of wing 402 that hits the air particles first. Trailing edge 406 is a part of wing 402 that hits the air particles last. Upper surface 408 is the surface of wing 402 between leading edge 404 and trailing edge 406 on the upper or top portion of wing 402. Lower surface 410 is the surface of wing 402 between leading edge 404 and trailing edge 406 on the lower or bottom portion of wing 402.

Wing 402 includes a reactive spoiler 420 disposed on upper surface 408 between leading edge 404 and trailing edge 406. Reactive spoiler 420 is a mechanism configured to reduce lift of wing 402 by spoiling an airflow over upper surface 408 of wing 402. Reactive spoiler 420 is mounted, located, or otherwise disposed on wing 402 in the location of a traditional spoiler. Thus, reactive spoiler 420 is mounted between leading edge 404 and trailing edge 406 in the chordwise direction (as opposed to being mounted as a trailing edge feature). Reactive spoiler 420 includes a turbine 422 (or multiple turbines) configured to raise in relation to upper surface 408 into an airflow 430 passing over upper surface 408 when in a deployed position (as shown in FIG. 4). A turbine 422 is a device that converts kinetic energy into mechanical energy. Turbine 422 may have a variety of configurations to raise above upper surface 408. For example, turbine 422 may pivot about an axis to the deployed position so that it projects above upper surface 408. In another example, turbine 422 may translate or slide generally perpendicular to upper surface 408 to the deployed position so that it projects above upper surface 408. When in the deployed position, turbine 422 is at a desired angle of attack with regard to the airflow 430. As the airflow 430 passes by or through turbine 422, turbine 422 spins due to the kinetic energy of the airflow 430 and converts the kinetic energy into mechanical energy. Turbine 422 disrupts airflow 430 when deployed as shown in FIG. 4 to create a stall over a wing section 434 behind turbine 422. Also, rotation of turbine 422 converts the kinetic energy of the airflow 430 into electrical energy via an integrated or external generator. Thus, reactive spoiler 420 operates in a similar manner to a traditional spoiler (e.g., spoiler 128 in FIGS. 1-2) in that it reduces lift of a wing 402, but also adds the additional benefit of converting kinetic energy of the airflow 430 into electrical energy that may be used by the aircraft, such as to charge one or more batteries on the aircraft.

Turbine 422 may be selectively deployed in flight to reduce the lift of wing 402. For example, turbine 422 may be deployed during descent of the aircraft. Turbine 422 may also be selectively stowed when not in use. FIG. 5 is another schematic cross-sectional view of wing 402 in an illustrative embodiment. As shown in FIG. 5, turbine 422 is configured to retract below upper surface 408 out of the airflow 430 passing over upper surface 408. Turbine 422 is in a retracted position as shown in FIG. 5. Wing 402 includes a wing cavity 502, which comprises an empty volume within wing 402 that is accessible through upper surface 408. Wing cavity 502 is between leading edge 404 and trailing edge 406 in the chordwise direction. Turbine 422 is configured to retract into wing cavity 502 so that it is situated below upper surface 408 and out of the airflow 430. Turbine 422 may have a variety of configurations to retract below upper surface 408. For example, turbine 422 may pivot about an axis to the retracted position so that it is stowed within wing cavity 502. In another example, turbine 422 may translate or slide generally perpendicular to upper surface 408 to the retracted position so that it is stowed within wing cavity 502. It may be beneficial for reactive spoiler 420 to have a similar footprint as a traditional spoiler, so wing cavity 502 may comprise an existing cavity in a wing 402. Alternatively, wing cavity 502 may be specifically designed to accommodate turbine 422.

To maintain the aerodynamic properties of wing 402 when turbine 422 is in the retracted position, reactive spoiler 420 may further include a cover panel that covers wing cavity 502. FIG. 6 is another schematic cross-sectional view of wing 402 in an illustrative embodiment. As shown in FIG. 6, a cover panel 602 is configured to cover turbine 422 and wing cavity 502 when turbine 422 is in the retracted position. Cover panel 602 may comprise a sheet of material, a sheet of material covered with a wing skin, a structural frame covered with a wing skin, etc. When cover panel 602 is closed as in FIG. 6, it is generally flush with upper surface 408 to maintain the aerodynamic properties of wing 402. Although not shown in FIG. 6, cover panel 602 is also configured to open so that turbine 422 may be deployed as shown in FIG. 4. To open, cover panel 602 may pivot, slide, or otherwise move to allow turbine 422 to deploy.

Figure 7:
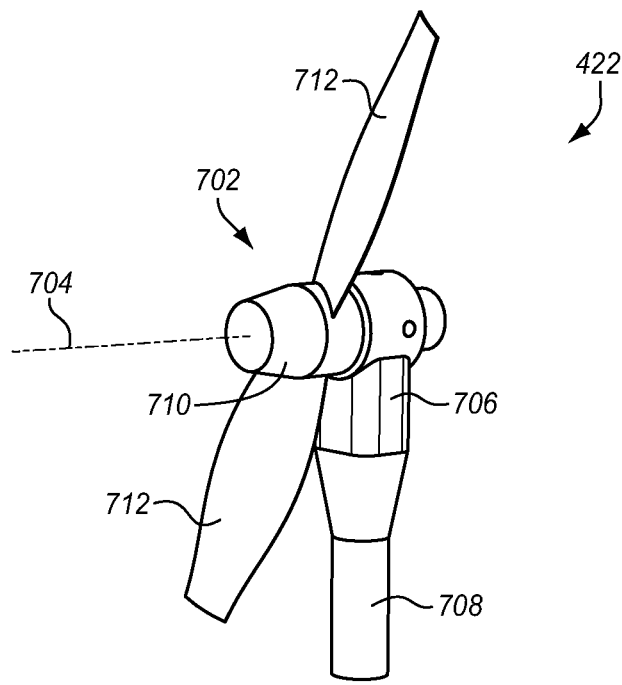
FIG. 7 is a perspective view of a turbine in an illustrative embodiment.

FIG. 7 is a perspective view of turbine 422 in an illustrative embodiment. Turbine 422 includes a rotor 702 configured to spin or rotate about an axis 704. Rotor 702 includes a hub 710, and a plurality of blades 712 that project radially from hub 710. Although two blades 712 are illustrated in FIG. 7, rotor 702 may have more blades in other embodiments. Also, the size, shape, pitch, etc., of blades 712 is shown as an example, and may vary as desired. Turbine 422 further includes a driven mechanism 706 and a mounting arm 708. A shaft (not visible) is coupled between rotor 702 and driven mechanism 706. The components of driven mechanism 706 are covered by a housing and are not visible. However, driven mechanism 706 may include a gear box, a generator, a hydraulic pump, and/or other components. Mounting arm 708 is configured to connect turbine 422 to wing 402.

Figure 8:
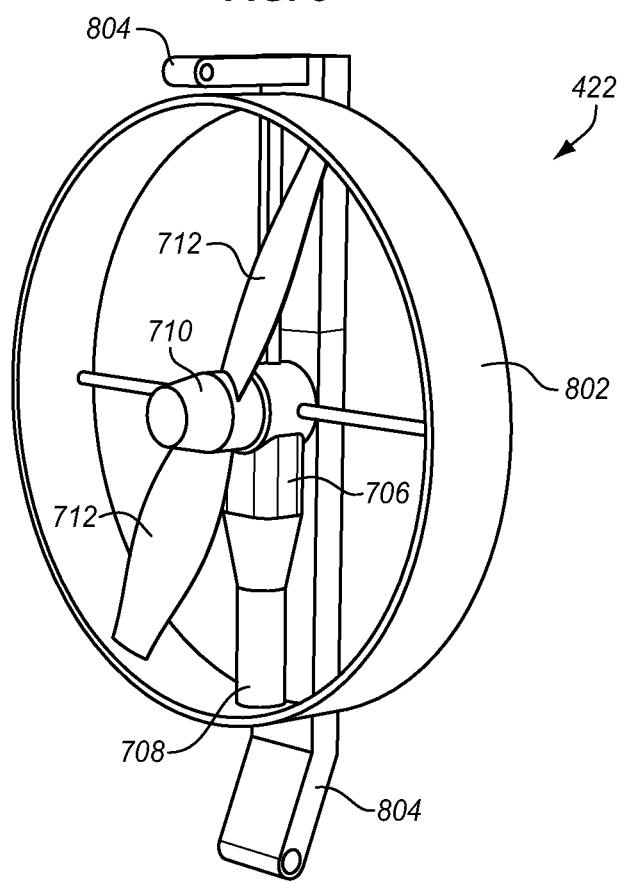
FIG. 8 is a perspective view of a turbine in another illustrative embodiment.

FIG. 8 is a perspective view of turbine 422 in another illustrative embodiment. In this embodiment, turbine 422 further includes a shroud 802 that surrounds rotor 702. Shroud 802 may be configured to guard rotor 702 from other components. Shroud 802 may also provide mounting locations for turbine 422 in addition to mounting arm 708 or in place of mounting arm 708. For example, shroud 802 may include mounting tabs 804 configured to connect turbine 422 to wing 402, to cover panel 602, or to another body.

Figure 9:
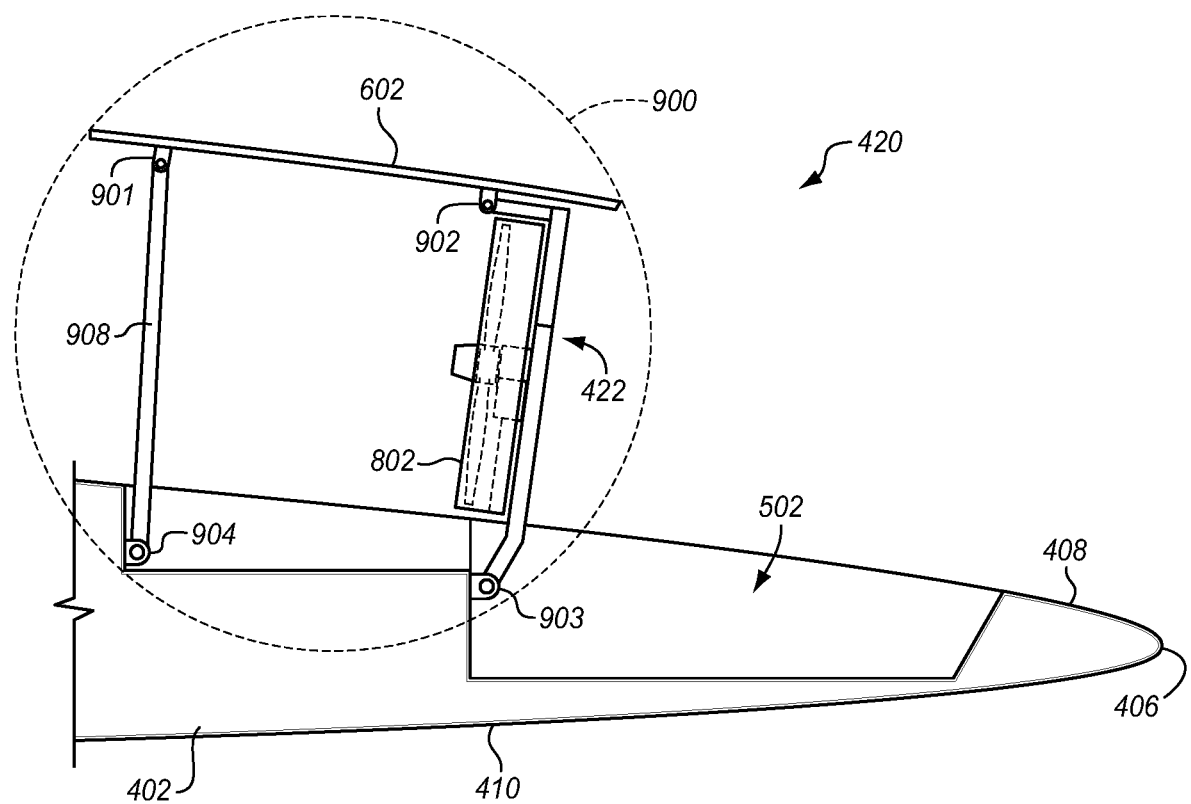
FIGS. 9-10 are schematic cross-sectional views of a wing in another illustrative embodiment.
Figure 10:
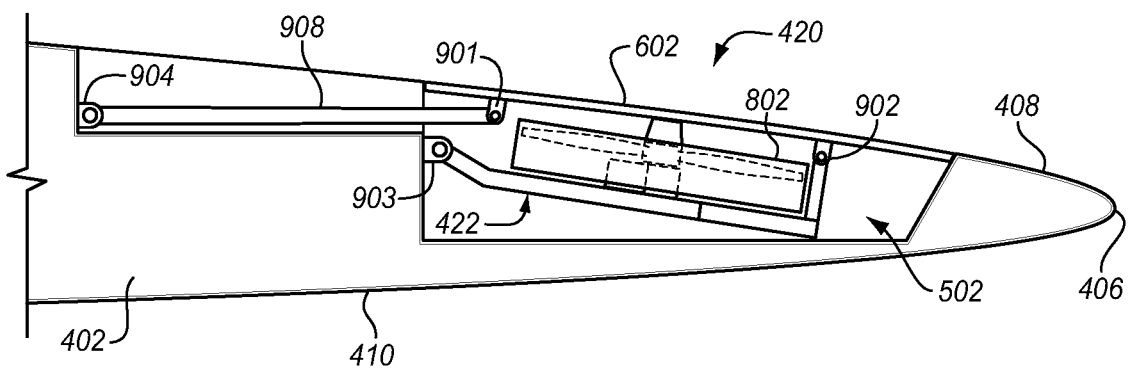

FIGS. 9-10 are schematic cross-sectional views of wing 402 in another illustrative embodiment. The embodiment in FIGS. 9-10 is one particular configuration for reactive spoiler 420, although other configurations are considered herein. In FIG. 9, for example, reactive spoiler 420 is again disposed on upper surface 408 of wing 402, and is in a deployed position. In this embodiment, reactive spoiler 420 is configured with a four-bar linkage 900 that is used to deploy (i.e., raise) and retract turbine 422 and cover panel 602. Four-bar linkage 900 includes four bars (or links) connected in a loop by four joints. For instance, four-bar linkage 900 includes joints 901-904. Joints 901-904 are shown as revolute joints to form a planar quadrilateral linkage, although one or more of joints 901-904 may be a prismatic joint in other embodiments. A first one of the four bars of four-bar linkage 900 is the body of cover panel 602 disposed between joint 901 and joint 902. A second one of the four bars is the body of turbine 422 and/or shroud 802 disposed between joint 902 and joint 903. A third one of the four bars is the body of wing 402 disposed between joint 903 and joint 904. A fourth one of the four bars is a connecting arm 908 disposed between joint 904 and joint 901. With this configuration, turbine 422 and cover panel 602 are configured to raise as a unit in relation to upper surface 408 of wing 402. When deployed, turbine 422 is placed into an airflow (not shown) passing over upper surface 408. The orientation of cover panel 602 in relation to the airflow, the design of cover panel 602, or other aerodynamic properties of cover panel 602 may be tuned as desired, such as by adjusting the four-bar linkage 900 (e.g., adjusting the length of the bars, the position of joints 901-904, etc.).

In FIG. 10, turbine 422 and cover panel 602 are configured to retract as a unit in relation to upper surface 408 of wing 402. Turbine 422 is configured to retract into wing cavity 502 so that it is situated below upper surface 408 and out of the airflow. Cover panel 602 is configured to cover turbine 422 and wing cavity 502 when turbine 422 is in the retracted position, and be generally flush with upper surface 408 to maintain the aerodynamic properties of wing 402. Although turbine 422 pivots upward from a front side of wing cavity 502 in this example configuration, turbine 422 may pivot upwards from an aft side of wing cavity 502 in other configurations.

Figure 11:
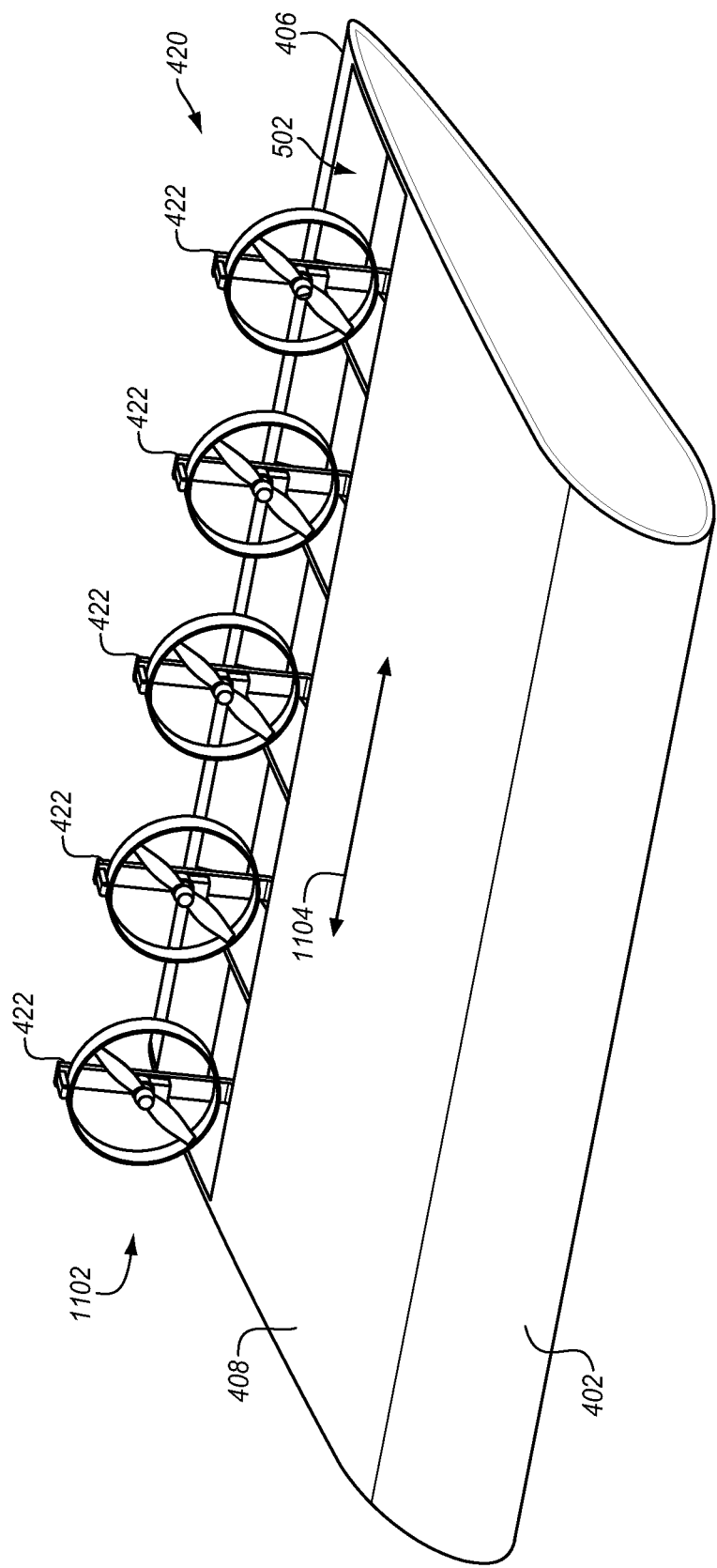
FIG. 11 is a perspective view of a reactive spoiler in an illustrative embodiment.
Figure 12:
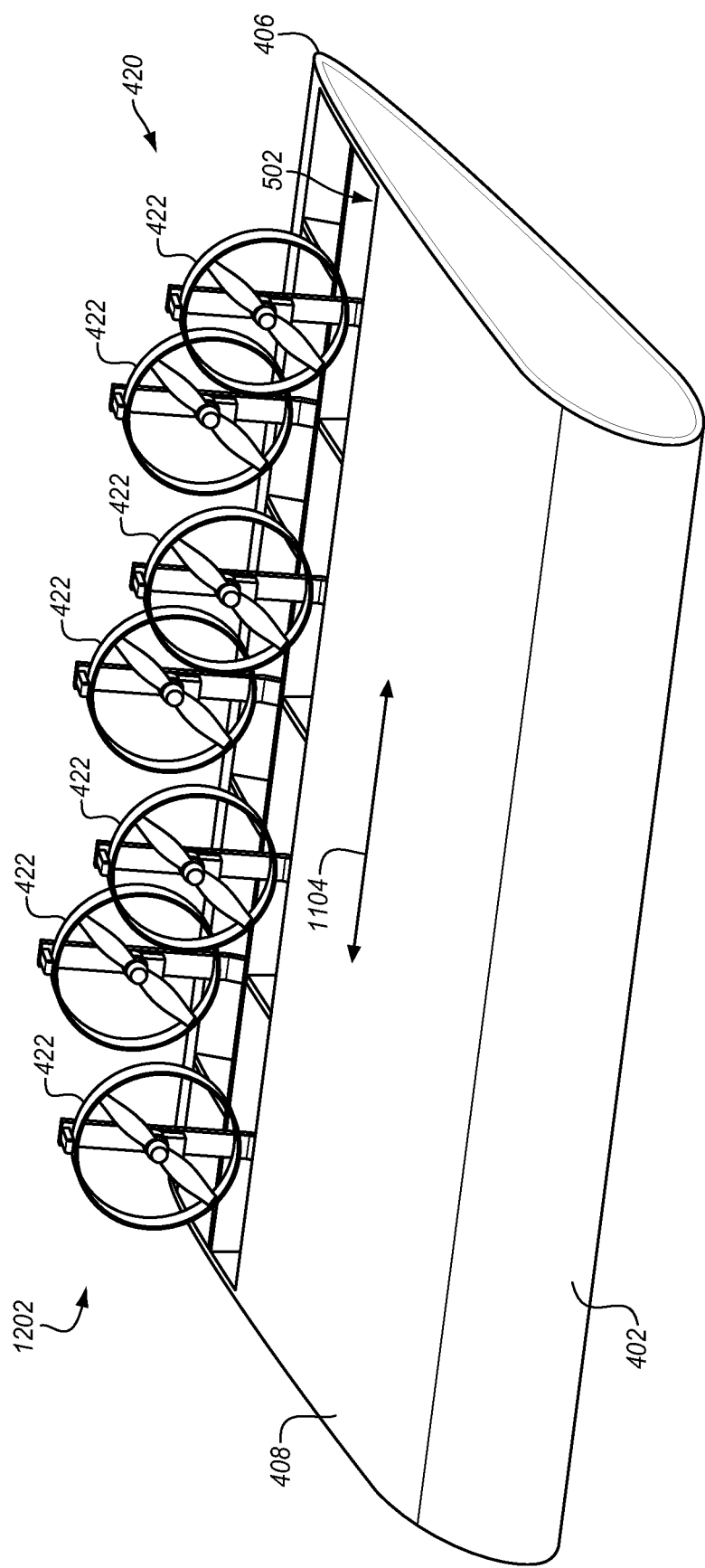
FIG. 12 is a perspective view of a reactive spoiler in another illustrative embodiment.

A reactive spoiler 420 as described herein may include a plurality of turbines 422 that are arranged in a desired manner to act as a spoiler and to harvest energy from the airflow. FIG. 11 is a perspective view of a reactive spoiler 420 in an illustrative embodiment. A cover panel 602, if implemented, has been removed in this figure. In this embodiment, reactive spoiler 420 includes a plurality of turbines 422 aligned linearly in a row 1102 along a length 1104 of wing 402. Turbines 422 may be linked to one another (e.g., as part of four-bar linkage 900) to deploy and retract as a unit. Alternatively, turbines 422 may deploy and retract independently. FIG. 12 is a perspective view of a reactive spoiler 420 in another illustrative embodiment. Again, a cover panel 602, if implemented, has been removed in this figure. In this embodiment, reactive spoiler 420 includes a plurality of turbines 422 arranged in an array 1202 along a length 1104 of wing 402. Reactive spoiler 420 is scalable based on the size, height, and number of turbines 422. Thus, the number of turbines 422 and the positioning of turbines 422 in FIGS. 11-12 is provided as an example, and reactive spoiler 420 may be implemented with a plurality of turbines 422 in other configurations.

Figure 13:
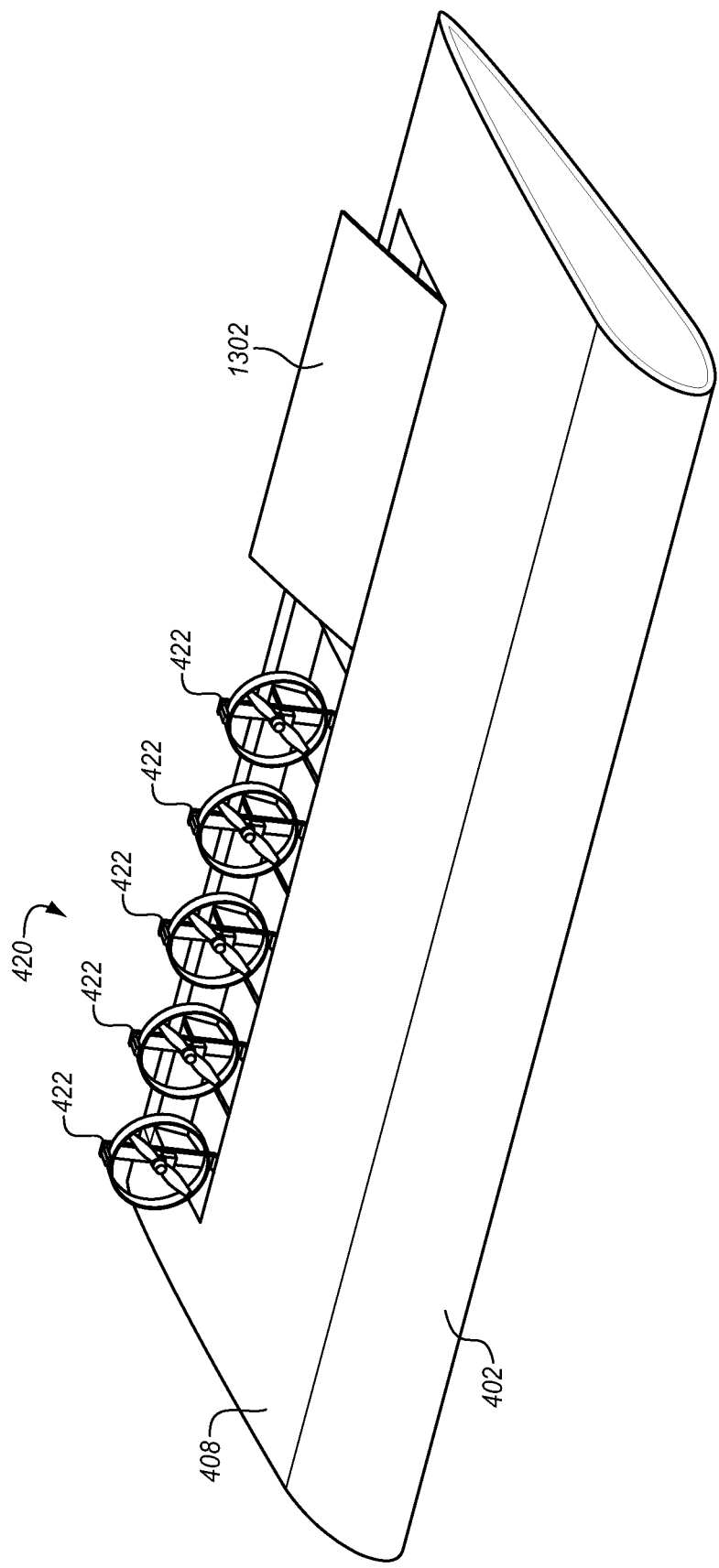
FIG. 13 is a perspective view of a wing in an illustrative embodiment.
Figure 14:
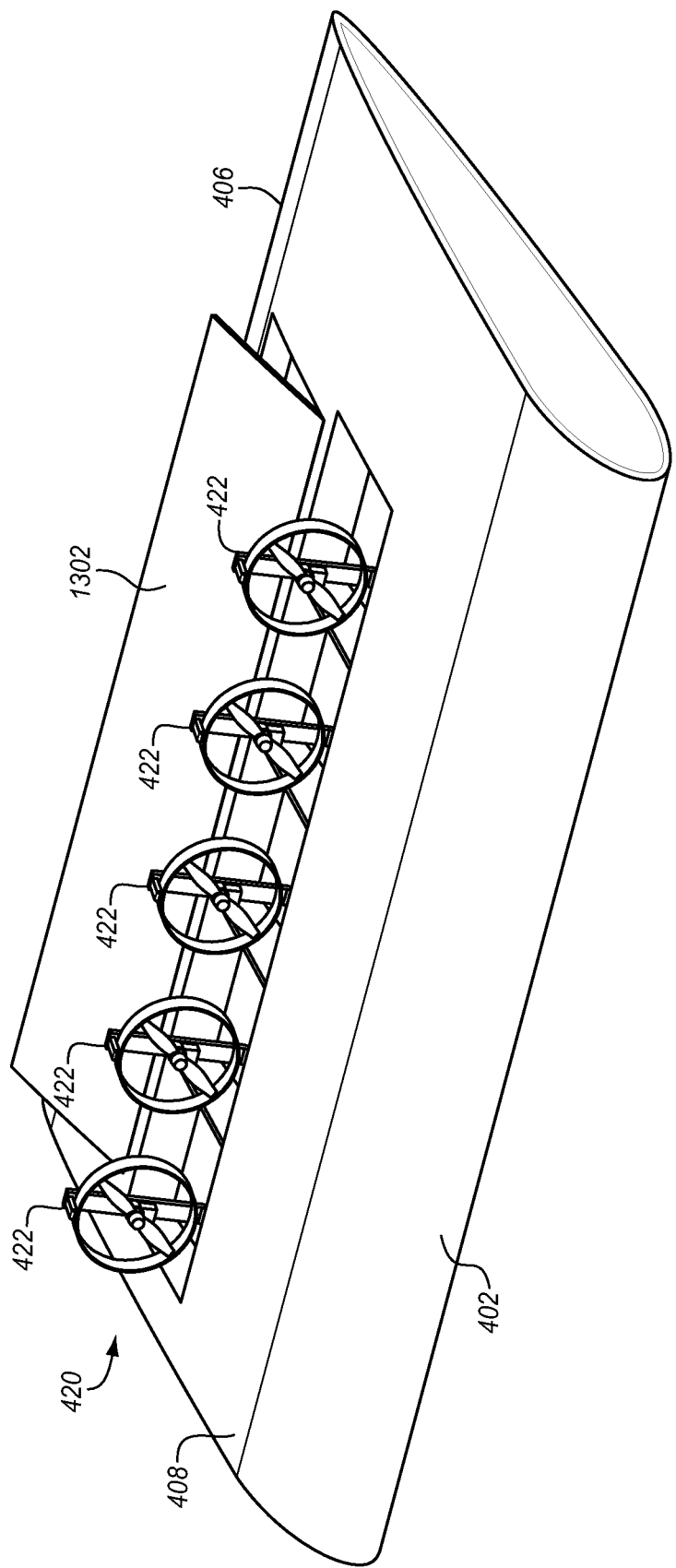
FIG. 14 is a perspective view of a wing in another illustrative embodiment.

Reactive spoiler 420 may be incorporated onto wing 402 along with one or more traditional spoilers. FIG. 13 is a perspective view of wing 402 in an illustrative embodiment. In this embodiment, a reactive spoiler 420 is disposed on upper surface 408 of wing 402 adjacent to a traditional spoiler, which is referred to herein as a "panel" spoiler 1302. Reactive spoiler 420 may be disposed on upper surface 408 of wing 402 outboard from panel spoiler 1302 in one embodiment, or inboard from panel spoiler in another embodiment. FIG. 14 is a perspective view of wing 402 in an illustrative embodiment. In this embodiment, a reactive spoiler 420 is disposed on upper surface 408 of wing 402 upstream from or forward of panel spoiler 1302 in the chord-wise direction. In either FIG. 13 or 14, reactive spoiler 420 may have a similar footprint (e.g., length and width) as panel spoiler 1302 so that reactive spoiler 420 may be assembled in place of another panel spoiler on wing 402 either retroactively or during manufacture. During flight, reactive spoiler 420 may be deployed in place of panel spoiler 1302 or along with panel spoiler 1302, such as in a descent phase. Also, panel spoiler 1302 may be deployed instead of reactive spoiler 420, such as to assist in rolling an aircraft. While FIG. 14 shows a reactive spoiler 420 with a similar footprint as a panel spoiler 1302, it may be advantageous to have a smaller reactive spoiler 420 relative to the panel spoiler 1302 in order to minimize the volume of space and weight of the reactive spoiler 420 and since, as mentioned above, in many instances less than full panel spoiler capability is required. In this regard, even with a relatively small reactive spoiler size, the need to use relatively large panel spoilers may be reduced or eliminated in some or all instances.

Figure 15:
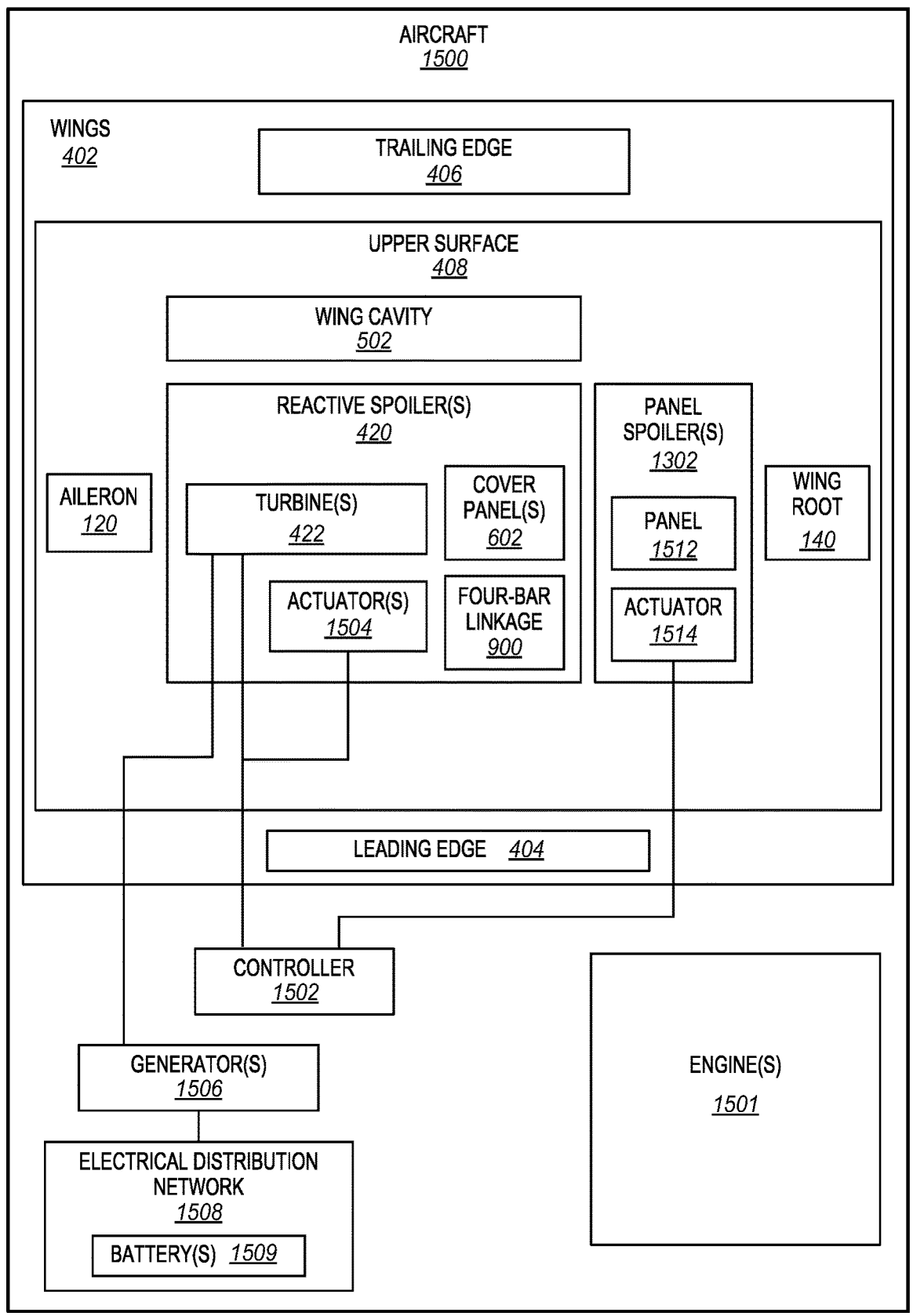
FIG. 15 is a schematic diagram of an aircraft in an illustrative embodiment.

FIG. 15 is a schematic diagram of an aircraft 1500 in an illustrative embodiment. Aircraft 1500 may comprise a commercial aircraft as shown in FIG. 1, or another type of aircraft that uses spoilers. Aircraft 1500 may include numerous components that are not shown or described for the sake of brevity. In this embodiment, aircraft 1500 includes one or more engines 1501 and wings 402. Engines 1501 are configured to provide thrust for aircraft 1500, and may comprise combustion engines (e.g., jet engines), electric engines, and/or hybrid electric engines. Wings 402 have a leading edge 404, a trailing edge 406, and an upper surface 408 between leading edge 404 and trailing edge 406, such as is shown in FIGS. 4-6. Wings 402 include one or more reactive spoilers 420 that are positioned at a location of a traditional spoiler (i.e., in the chord-wise direction and lengthwise direction). For instance, reactive spoilers 420 are disposed on upper surface 408 between leading edge 404 and trailing edge 406 in the chord-wise direction. In the lengthwise direction (i.e., between wing root 140 and the wing tip), reactive spoilers 420 are located inboard from an aileron 120, or between wing root 140 and an aileron 120 of a wing 402.

A reactive spoiler 420 includes one or more turbines 422 that may be selectively deployed by a controller 1502 and one or more actuators 1504. Controller 1502 is implemented on a hardware platform comprised of analog circuitry, digital circuitry, and/or a processor that executes instructions stored in memory. A processor comprises an integrated hardware circuit configured to execute instructions, and a memory is a non-transitory computer readable storage medium for data, instructions, applications, etc., and is accessible by the processor. Controller 1502 may be part of the flight system for aircraft 1500. Actuator 1504 is a device configured to move turbines 422 based on commands from controller 1502. Actuator 1504 may comprise a ball screw, a hydraulic cylinder, or another type of actuator. Reactive spoiler 420 may further include one or more cover panels 602 as described in FIG. 6, and may be configured with a four-bar linkage 900 as shown in FIGS. 9-10.

Turbines 422 are configured to move between a deployed position and a retracted position via actuator 1504. When in the deployed position, turbines 422 are raised in relation to upper surface 408 into an airflow passing over upper surface 408 (see FIG. 4), and act as spoilers. When in the retracted position, turbines 422 are retracted below upper surface 408 and into wing cavity 502. In this embodiment, turbines 422 have two positions: deployed and retracted. In other words, turbines 422 are either fully deployed or stowed away via actuator 1504. Thus, controller 1502 is configured to provide a deploy (or extend) command or a retract command to actuator 1504 (e.g., to a solenoid-operated valve in actuator 1504). Controller 1502 may also be configured to adjust the amount of resistance of turbines 422.

Wings 402 may further include panel spoilers 1302. A panel spoiler 1302 may include a panel 1512 and an actuator 1514. Controller 1502 is coupled to actuator 1514 to control the position of panel 1512. Panel spoiler 1302 may comprise a flight spoiler that is used during flight operations. For a flight spoiler, controller 1502 may adjust an angle of panel 1512 between an extended and a stowed position as desired.

Panel spoiler 1302 may also comprise a ground spoiler that is not used during flight operations. For a ground spoiler, controller 1502 may adjust panel spoiler 1302 between a fully deployed position and a stowed position.

When reactive spoiler 420 is in the deployed position, the airflow along the upper surface 408 of wing 402 causes turbines 422 to spin due to the kinetic energy of the airflow. The spinning of turbines 422 disrupts the airflow to reduce lift of wing 402 behind turbines 422. Also, the kinetic energy of the airflow is converted into electrical energy. Aircraft 1500 further includes one or more generators 1506, which are devices that convert mechanical energy into electrical energy. Turbines 422 spin due to the airflow, and the turbines 422 cause rotation of generator 1506. For example, a generator 1506 may be integrated with a turbine 422, and they may be coupled to one another by a shaft, gear box, etc. When generator 1506 is integrated with turbine 422, turbine 422 may be referred to as a "turbine generator". Alternatively, a generator 1506 may be external from turbines 422, and they may be connected by a mechanical system, a hydraulic system, a pneumatic system, etc. One or more turbines 422 impart rotation to generator 1506, and the rotation of generator 1506 creates electrical energy that is supplied to electrical distribution network 1508 of aircraft 1500. Electrical distribution network 1508 may include a plurality of electrical systems, and/or one or more batteries 1509 or other electrical storage elements. Batteries 1509 may be used to supply power to electrical systems, to engines 1501, etc. Thus, reactive spoilers 420 provide dual functions of acting as a spoiler to reduce lift of wings 402, and to harvest energy from the airflow that is being spoiled. A technical benefit is that deployment of reactive spoilers 420 can charge batteries 1509 on aircraft 1500 during flight. For example, the descent of a commercial aircraft may take thirty minutes or more. If reactive spoilers 420 are deployed during the descent, then batteries 1509 may be charging for thirty minutes or more while aircraft 1500 is in flight. This may be beneficial for aircraft that use electrical systems for taxiing or other ground-based operations. It may also be beneficial for aircraft that use hybrid electric engines or electric engines for flight. For example, electricity produced by reactive spoilers 420 may reduce or eliminate the amount of time an aircraft engine or auxiliary power unit would otherwise be required to operate in order to produce electrical power.

Figure 16:
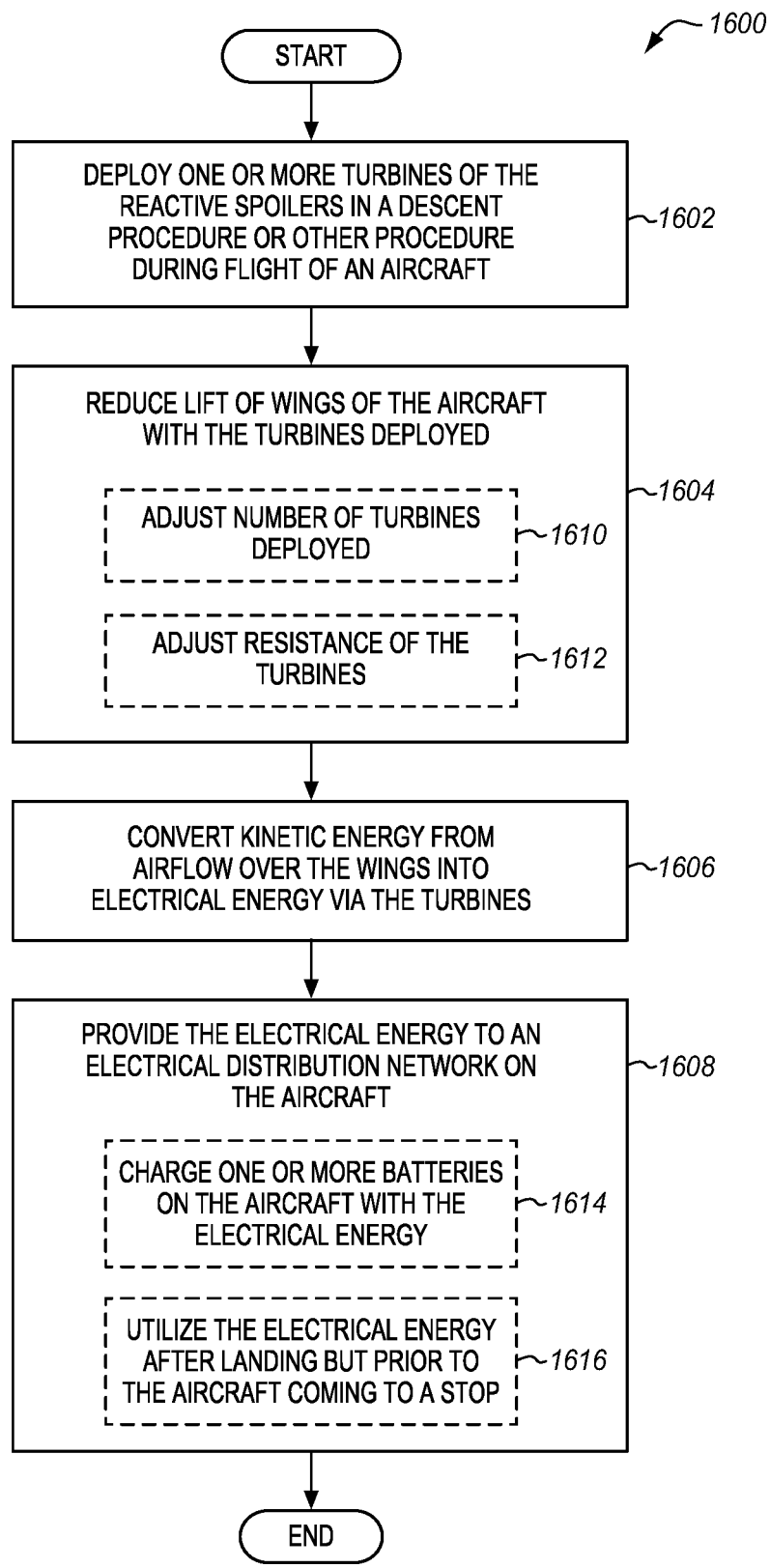
FIG. 16 is a flow chart illustrating a method of operating reactive spoilers on an aircraft in an illustrative embodiment.

FIG. 16 is a flow chart illustrating a method 1600 of operating reactive spoilers 420 on an aircraft in an illustrative embodiment. The steps of method 1600 will be described with respect to aircraft 1500 of FIG. 15, although one skilled in the art will understand that the methods described herein may be performed on other types of aircraft. The steps of the methods described herein are not all inclusive and may include other steps not shown. The steps for the flow charts shown herein may also be performed in an alternative order.

Controller 1502 is configured to deploy turbines 422 of reactive spoiler 420 during flight of aircraft 1500 (step 1602). For example, controller 1502 may receive input from a pilot or autopilot, and deploy turbines 422 during a descent phase or another phase of flight. Controller 1502 then sends commands to actuator(s) 1504 to raise (e.g., fully extend) turbines 422 above the upper surface 408 of wing 402. When deployed, turbines 422 reduce the lift of wings 402 (step 1604). The reduction of lift is provided at a wing section behind turbines 422, which is between wing root 140 and an aileron 120. Controller 1502 may adjust how much "spoiling" is provided by turbines 422. For example, controller 1502 may adjust a number (e.g., one or more) of turbines 422 deployed to control an amount of lift reduction provided by the turbines 422 (step 1610). Additionally or alternatively, controller 1502 may adjust a resistance of one or more of turbines 422 to control an amount of lift reduction provided by the turbines 422 (step 1612).

Further when deployed, kinetic energy from airflow over wings 402 is converted into electrical energy via turbines 422 (step 1606). As described above, the airflow over wings 402 causes turbines 422 to spin, which in turn causes rotation of generator 1506. The rotation of generator 1506 creates electrical energy. Thus, the kinetic energy of the airflow is converted into mechanical energy by turbines 422, and the mechanical energy from the turbines 422 is converted into electrical energy by generator 1506. The electrical energy is then provided to electrical distribution network 1508 (step 1608). For example, the electrical energy from generator 1506 may be used to charge batteries 1509 (step 1614). Thus, reactive spoilers 420 may provide a benefit in that batteries 1509 may be charged in flight while reactive spoilers 420 are used to reduce lift of wings 402. In another example, at least some of the electrical energy from generator 1506 and/or batteries 1509 may be utilized after landing aircraft 1500 but prior to aircraft 1500 coming to a complete stop (step 1616). Thus, engines 1501 of aircraft 1500 may be shut down after landing, and battery power may be used to taxi aircraft 1500 to a gate, such as by using an electric motor on the landing gear.

Although specific embodiments were described herein, the scope is not limited to those specific embodiments. Rather, the scope is defined by the following claims and any equivalents thereof.

The invention claimed is:

1. An aircraft comprising:
   wings; and
   an electrical distribution network;
   wherein each wing of the wings includes:
   a leading edge;
   a trailing edge;
   a reactive spoiler disposed on an upper surface of the wing between the leading edge and the trailing edge; and
   a panel spoiler disposed on the upper surface;
   wherein the reactive spoiler is deployable concurrently with the panel spoiler;
   wherein the reactive spoiler comprises a turbine configured to raise in relation to the upper surface into an airflow passing over the upper surface when in a deployed position, and to retract below the upper surface when in a retracted position;
   wherein in the deployed position, rotation of the turbine disturbs the airflow to reduce lift of a wing section behind the turbine, and converts kinetic energy from the airflow into electrical energy supplied to the electrical distribution network.

2. The aircraft of claim 1 wherein:
   the panel spoiler is disposed inboard from the reactive spoiler.

3. The aircraft of claim 1 wherein:
   the panel spoiler is disposed outboard from the reactive spoiler.

4. The aircraft of claim 1 wherein:
   the reactive spoiler is disposed forward of the panel spoiler.

5. The aircraft of claim 1 wherein:
   the electrical distribution network comprises one or more batteries configured to provide power to at least one of an electric engine, a hybrid electric engine, and an electrical propulsion system.

6. The aircraft of claim 1 wherein:
the turbine is configured to retract below the upper surface and into a wing cavity when in the retracted position; and
the reactive spoiler further comprises a cover panel configured to cover the turbine and the wing cavity when in the retracted position.

7. The aircraft of claim 6 wherein:
the cover panel is flush with the upper surface of the wing when in the retracted position.

8. The aircraft of claim 1 wherein:
the reactive spoiler comprises a plurality of turbines aligned linearly in a row along a length of the wing.

9. The aircraft of claim 1 wherein:
the reactive spoiler comprises a plurality of turbines arranged in an array along a length of the wing.

10. An aircraft comprising:
wings;
an electric engine configured to provide thrust for the aircraft; and
one or more batteries configured to provide power to the electric engine;
wherein each wing of the wings includes:
  a reactive spoiler disposed on an upper surface of the wing between a leading edge and a trailing edge; and
  a panel spoiler disposed on the upper surface of the wing;
  wherein the reactive spoiler is deployable concurrently with the panel spoiler;
wherein the reactive spoiler includes a turbine selectively deployed between a deployed position and a retracted position;
wherein in the deployed position, rotation of the turbine disturbs airflow to reduce lift of a wing section behind the turbine, and converts kinetic energy from the airflow into electrical energy to charge the one or more batteries.

11. The aircraft of claim 10 wherein:
the panel spoiler is disposed inboard from the reactive spoiler.

12. The aircraft of claim 10 wherein:
the panel spoiler is disposed outboard from the reactive spoiler.

13. The aircraft of claim 10 wherein:
the reactive spoiler is disposed forward of the panel spoiler.

14. The aircraft of claim 10 further comprising:
a controller configured to adjust a resistance of the turbine to adjust an amount of lift reduction provided by the turbine.

15. The aircraft of claim 10 wherein:
the turbine is configured to retract below the upper surface and into a wing cavity when in the retracted position; and
the reactive spoiler further comprises a cover panel configured to cover the turbine and the wing cavity when in the retracted position.

16. An aircraft comprising:
wings;
an electric engine or a hybrid electric engine configured to provide thrust for the aircraft; and
one or more batteries configured to provide power to the electric engine or the hybrid electric engine;
wherein each wing of the wings includes:
  a reactive spoiler disposed on an upper surface of the wing between a leading edge and a trailing edge; and
  a panel spoiler disposed on the upper surface of the wing;
  wherein the reactive spoiler is deployable concurrently with the panel spoiler;
  wherein the reactive spoiler includes a turbine selectively deployed between a deployed position and a retracted position;
  wherein in the deployed position, rotation of the turbine disturbs airflow to reduce lift of a wing section behind the turbine, and converts kinetic energy from the airflow into electrical energy to charge the one or more batteries.

17. The aircraft of claim 16 further comprising:
a controller configured to adjust a resistance of the turbine to adjust an amount of lift reduction provided by the turbine.

18. The aircraft of claim 16 wherein:
the panel spoiler is disposed inboard from the reactive spoiler.

19. The aircraft of claim 16 wherein:
the panel spoiler is disposed outboard from the reactive spoiler.

20. The aircraft of claim 16 wherein:
the reactive spoiler is disposed forward of the panel spoiler.

* * * * *